United States Patent
Begeja et al.

[11] Patent Number: 5,912,963
[45] Date of Patent: Jun. 15, 1999

[54] METHOD AND APPARATUS FOR PROVIDING AN ALTERNATE TELECOMMUNICATIONS NETWORK

[75] Inventors: Lee Begeja, Gillette; Steven Lloyd Greenspan, Scotch Plains, both of N.J.

[73] Assignee: AT&T Corp., Middletown, N.J.

[21] Appl. No.: 08/811,435

[22] Filed: Mar. 3, 1997

[51] Int. Cl.⁶ .................................................... H04M 7/00
[52] U.S. Cl. ........................ 379/221; 379/220; 379/273
[58] Field of Search .................................. 379/272, 273, 379/279, 221, 93.14, 93.08, 909, 914, 911, 220, 102.01

[56] References Cited

U.S. PATENT DOCUMENTS

| | | | |
|---|---|---|---|
| 4,560,841 | 12/1985 | Pierrel | 379/413 |
| 4,972,452 | 11/1990 | Chack et al. | 379/2 |
| 5,187,706 | 2/1993 | Frankel et al. | 370/217 |
| 5,214,692 | 5/1993 | Chack et al. | 379/265 |
| 5,216,704 | 6/1993 | Williams et al. | 379/93.08 |
| 5,329,578 | 7/1994 | Brennan et al. | 379/88.19 |
| 5,367,562 | 11/1994 | Tourbah et al. | 379/93.07 |
| 5,379,337 | 1/1995 | Castillo et al. | 379/45 |
| 5,404,350 | 4/1995 | DeVito et al. | 370/217 |
| 5,414,756 | 5/1995 | Levine | 379/88.2 |
| 5,434,973 | 7/1995 | Lu | 395/200 |
| 5,454,025 | 9/1995 | Mulrow et al. | 379/45 |
| 5,548,639 | 8/1996 | Ogura et al. | 379/221 |
| 5,563,938 | 10/1996 | Soshea et al. | 379/201 |
| 5,638,428 | 6/1997 | Berku et al. | 379/100.06 |
| 5,696,817 | 12/1997 | Yatsu | 379/252 |

*Primary Examiner*—Reinhard J. Eisenzopf
*Assistant Examiner*—Charles N. Appiah

[57] ABSTRACT

A media selection device is in functional parallel with an alternate local telephone network and an existing local telephone network. Upon detecting a loss of local power, the device switches to the local exchange network based on the assumption that the local exchange network is operable, despite the loss of local power. While power is supplied to the device, originating calls are transmitted from the telephone to the device and to the alternate network. Incoming calls from the alternate network are transmitted to the device and to the telephone. Alternatively, incoming and outgoing calls are also selectably engageable on the local exchange network without disrupting telephone service on the alternate network. Differences in dial tone indicate which network is currently being used.

29 Claims, 5 Drawing Sheets

METHOD AND APPARATUS FOR PROVIDING AN ALTERNATE TELECOMMUNICATIONS NETWORK

BACKGROUND OF THE INVENTION

The present invention relates generally to a method and apparatus for providing an alternate telecommunications network whenever a power failure occurs. More specifically, the present invention relates to a method and apparatus for providing an automatic switch over to an alternate carrier network in the event of a power failure, without the need for user intervention or investment in expensive backup powering systems.

For purposes of clarification and as used herein, local loop refers to the wires and other communication media, which run from the local exchange, or central office, to the subscriber's premises and which provide dial-tone and powering to a subscriber handset. These local loops are maintained and provided by a local exchange carrier (LECs) servicing a particular region, and provide what is commonly known in the industry as local access service. In addition and as used herein, an alternate telecommunications network shall refer to a telecommunications network operated by a carrier other than a LEC, and to a carrier which uses a means of communications other than existing local loops. These alternate networks or alternate carrier networks use for the most part, a variety of communications means, including wireless transmission, cable, satellite, microwave, RF and the like and compete with the LECs for local access service. The bypass technology employed by these alternate carriers are configured and developed to obviate the need for substantial investment in the duplication of local loop wiring in order to provide dial-tone and uninterrupted power to subscribers.

In today's communications market, subscribers have assumed and taken for granted the continuous availability of telephone service, even during a local power outage. Such a presumption is predicated on the fact that a local loop terminating at a subscriber site has traditionally provided remote power and dial-tone to a subscriber handset. Hence, entry into the local access market, by any carrier, would necessitate a level of service at least comparable to the level of service and security provided by the traditional local exchange carriers. However, in the wake of the new competitive arena spawned by the breakup of the Bell System, new and emerging communications companies have entered the competitive arena without a means for providing uninterrupted power. As a result, many potential subscribers are reluctant to stray away from traditional phone service and embrace the alternate forms of communications, when faced with the prospects of utilizing a system which cannot ensure telephone access. On the other hand, because significant investments have already been made by the LECs to provide a powering infrastructure, it would be improvident and inefficient for every new alternate carrier to make a similar investment in infrastructure in order to enter the local access market.

Although several patents have issued relating to the use of local exchange power to enhance telephone service, none of these patents address the invention as disclosed herein. For example, U.S. Pat. No. 5,553,138 relates to a low-power consumption power supply which captures its power from telephone lines rather than from a wall outlet. In a cordless base station-mobile station modem communication system, power to the base station is required even though the system is off-hook. When power in a charge storage device such as a capacitor becomes too low, the unit momentarily goes off hook to recharge the capacitor. Charge control of the capacitor is performed by either discrete circuitry or by a microcontroller.

U.S. Pat. No. 5,343,514 discloses a telephone line powered device for use in conjunction with a telephone connected to a telephone line. The device includes a control system which is placed on standby or ready mode of operation when the telephone goes off-hook. The standby mode is a low power mode of operation which permits the device to appear transparent to the telephone user. When the device is used for communications, such as in the case when the device functions as a credit card reader, the phone is disabled and the device seizes control of the telephone line. After operation of the device, the telephone is enabled for normal exchange and the device reverts back to its standby mode of operation.

U.S. Pat. No. 5,157,711 discloses a telephone terminal device which can minimize the power consumption of built-in batteries, by effectively utilizing power supplied by a telephone line. Telephone line power is used to drive an automatic answering circuit and other circuits so that the device can be serviceable for hours without replacing the batteries. In this manner, the device remains functional even in the event of a power failure.

Accordingly, there is a need for a device to provide an alternate source of power and means of communications in the event of a power outage. The present invention is therefore directed to the problem of developing a method and apparatus for providing an alternate means of communications through the use of power from an existing powering infrastructure created by the local exchange carriers.

SUMMARY OF THE INVENTION

The method of the present invention solves the above mentioned problem of alternate network accessibility and uninterrupted power, by coupling a local exchange network in functional parallel with an alternate carrier network and thereafter switching between the two networks depending upon the state of the original power source. After detecting a loss of power at a subscriber site, the present invention switches over to the local exchange network on the assumption that the existing local loop network is operational despite the loss of local power, and is therefore capable of providing power and dial-tone to the subscriber. The switch over is temporary however and upon resumption of local power, the present invention will switch the subscriber back to the alternate carrier network. Thus, while power is supplied to the media selection device at the subscriber site, originating calls are routed from the telephone handset to the alternate carrier network; while incoming calls are routed from the alternate carrier network to the subscriber handset. Concurrent with this mode of operation, incoming and outgoing calls on the local loop, may be selectably received and made, without disrupting telephone service on the alternate carrier network.

According to another embodiment of the present invention, the media selection device detects the lack of power during a power outage, and uses the existing local exchange network for all originating calls. Differences in dial tone indicate which network is being used. When the power is restored, the media selection device switches back to the alternate carrier network.

The apparatus of the present invention includes a media selection device that couples at least two communications networks in functional parallel, detects the loss of power and then performs the necessary switching. The media selection device is coupled to the alternate carrier network and to a standard telephone handset. The media selection device also includes two other connections, one for power from the local power supply, and the other to the wall mounted jack, which in turn is connected to the local exchange network, in order for providing local exchange powering and dial-tone.

According to another embodiment of the present invention, the apparatus of the present invention also includes a receiver/transmitter, which can be either a fixed wireless receiver/transmitter, a cable modem or any other alternate carrier communications device. Such a device however is preferably inconspicuous in design and may be located in distal and inconspicuous locations, such as on a roof or in an attic while in communication with the subscriber handset.

According to yet another embodiment of the present invention, the media selection device includes a manual override switch that enables a user to select which telecommunications network will be used for a particular telephone call. In addition, the media selection device is programmable to permit a user to program or download data to the media selection device, and to program the media selection device to always use the existing local exchange carrier for emergency calls, such as 911 calls, or some other set of specified telephone numbers, such as international, local toll or long distance calls.

According to still yet another embodiment of the present invention, the media selection device includes a controllable switch, with two states. In a first state of the switch, a telephone channel is coupled from the alternate telecommunications network to the handset, and in the second state the telephone channel is coupled from the existing local wired loop telecommunications network to the handset, and depending upon the state of the switch, calls can be routed from either network to the handset or from the handset to the network of choice.

According to yet another embodiment of the present invention, the media selection device includes a controllable switch that has a second input to which a second handset can be connected, which permits two separate telephone channels to be passed through the switch at all times.

BRIEF DESCRIPTION OF THE DRAWINGS

FIG. 2b shows components of the controller in FIG. 2a.

DETAILED DESCRIPTION

Figure 1:
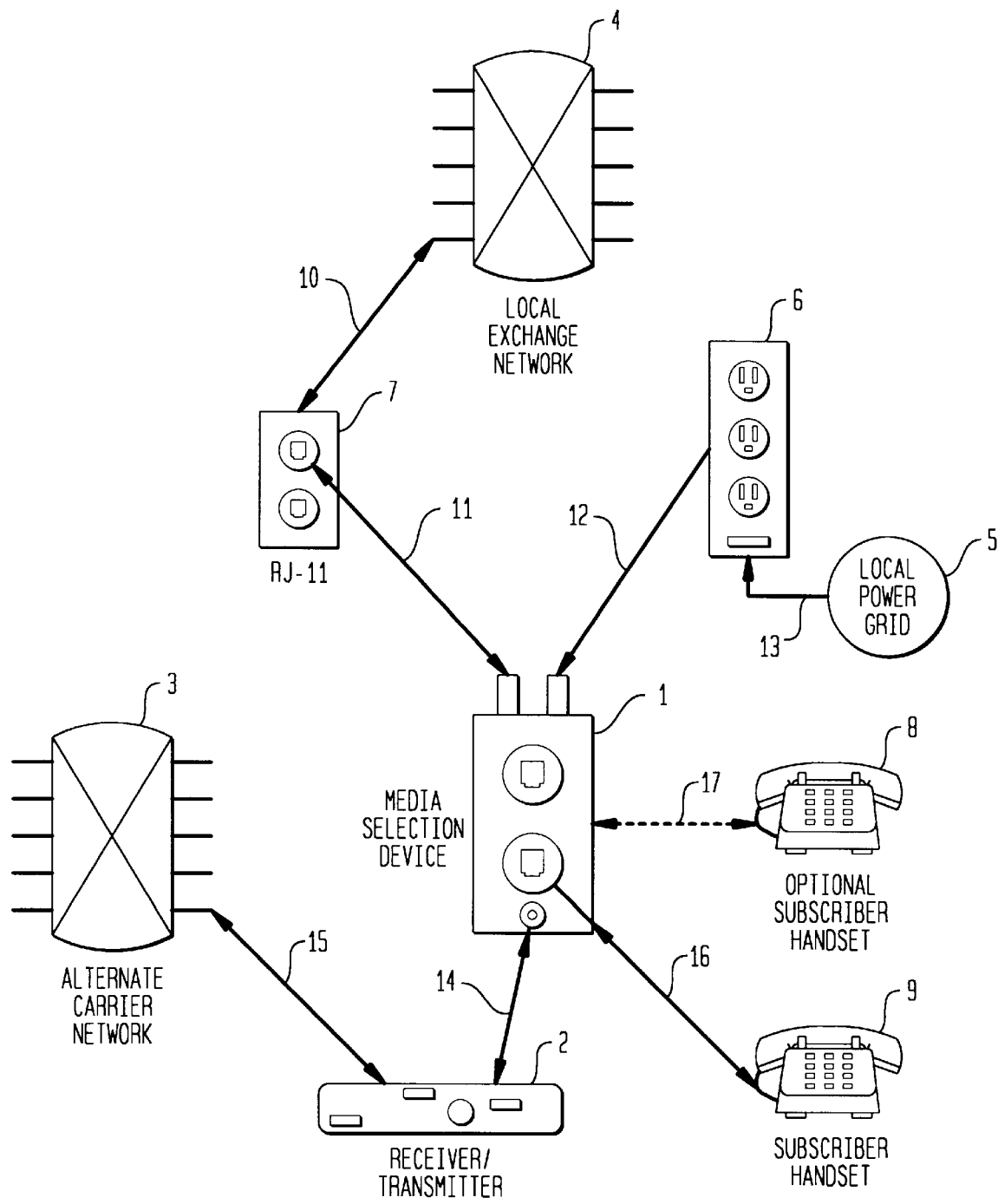
FIG. 1 depicts a block diagram of the present invention.

Referring to FIG. 1, a media selection device 1 is shown, which is connected to an existing local power grid 5 via existing local power wiring 13, power outlet 6 and power cord 12 that plugs into the power outlet 6. The media selection device 1 is also coupled to an existing local exchange carrier 4 (local loop) via an existing RJ-11 jack 7 and standard telephone cord 11 that plugs into the RJ-11 jack 7. The media selection device 1 has one or more RJ-11 receptors into which an existing telephone handset 9 can be inserted. The media selection device 1, as powered by local power grid 5, is also connected to an alternate carrier network 3 via a known receiver/transmitter 2. The connection between the receiver/transmitter and the alternate carrier network 3 may be wireless, cable, satellite, or any other media that bypasses the existing local wired loop network 4.

Normally, the receiver/transmitter 2 would connect directly to the telephone handset 9, however, such a connection requires local power (subscriber provided power) to operate as the receiver/transmitter 2. According to the present invention, however, the media selection device 1 is preferably disposed between the telephone handset 9 and the receiver/transmitter 2, as well as between the telephone handset 9 and the local exchange carrier network 4. Functionally, this configuration places the two telecommunications networks 3, 4 in parallel with telephone handset 9.

The media selection device 1 has an electrical power cord 12 with a plug that plugs into the local power outlet 6 in the house. This provides a power connection from the local power grid 5 to the media selection device 1.

The media selection device 1 plugs directly into the RJ-11 jack 7 via standard telephone wiring 11. The RJ-11 jack 7 is connected through wiring 10 to the existing local exchange network 4, operated by an LEC. As a result, the media selection device 1 is connected in functional parallel to both the existing local exchange network 4 as well as the alternate carrier network 3.

The receiver/transmitter 2 is a generic reference to the multitude of alternate communication devices and therefore, the operation of such devices will not be discussed in detail, herein. However such devices may consist, for example, of a fixed wireless receiver/transmitter or a cable modem, which can be placed in an inconspicuous location, such as on a roof or in an attic. This receiver/transmitter 2 is connected to the media selection device 1 via a connection 14, which can be a cordless connection (e.g., a 900 MHz cordless link) or a cable connection using new or existing wiring.

The media selection device 1 is adaptable and is preferably designed to use existing connections between the receiver/transmitter 2 and subscriber telephone handset 9. If the connection between the telephone handset 9 and the receiver/transmitter 2 is a RJ-11 type connector, a similar and mateable receptacle connector is provided on the media selection device 1. However, the connection between handset 9 and the media selection device 1 may also be wireless and may similarly employ the use of 900 MHz technology. Under such a mode of operation, connections 14 and 16 operate on different and preferably non-interfering channels. As such, handset 9 may be linked to the media selection device 1 in various modes of communication, including standard wired/RJ-11 type access, wireless communications and the like.

During a power outage, media selection device 1 detects the lack of power from the local power grid 5, e.g., by detecting a lack of current or voltage, and immediately switches network access to the local exchange network 4 for all originating calls. Thus, in one embodiment, the media selection device 1 comprises a controller that is controlled by the presence or absence of subscriber power. (See FIG. 2.) More specifically, the media selection device 1 consists of a controller 22, which holds a connection between the alternate carrier network 3 and telephone handset 9 when power is applied and releases the connection back to the local exchange network when power falls below a given threshold. Although other components may be added, Controller 22 may simply include a spring loaded switch which functions such that when power is missing or falls below a threshold value, a default state is selected and the handset 9 and local exchange network 4 are connected.

As a means of notification to an end user, differences in dial-tone may be used to indicate which network is being utilized, i.e., either the existing local exchange network 4 or the alternate carrier network 3. Moreover, controller 22 may include a microprocessor and associated memory for storing information needed to allow the controller to react and process information related to a changing operating environment.

Figure 2A:
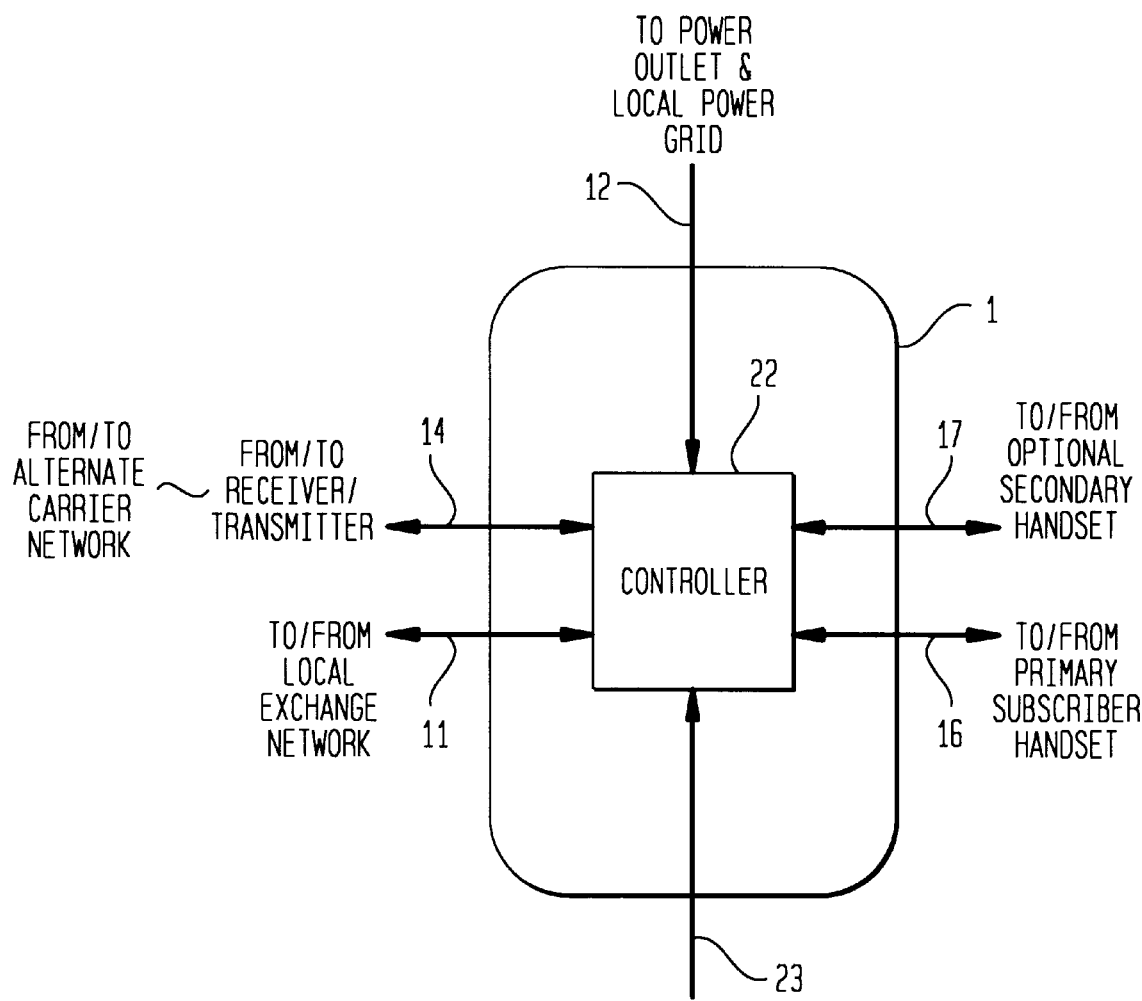
FIG. 2a depicts the controller of one embodiment of the present invention.
Figure 2B:
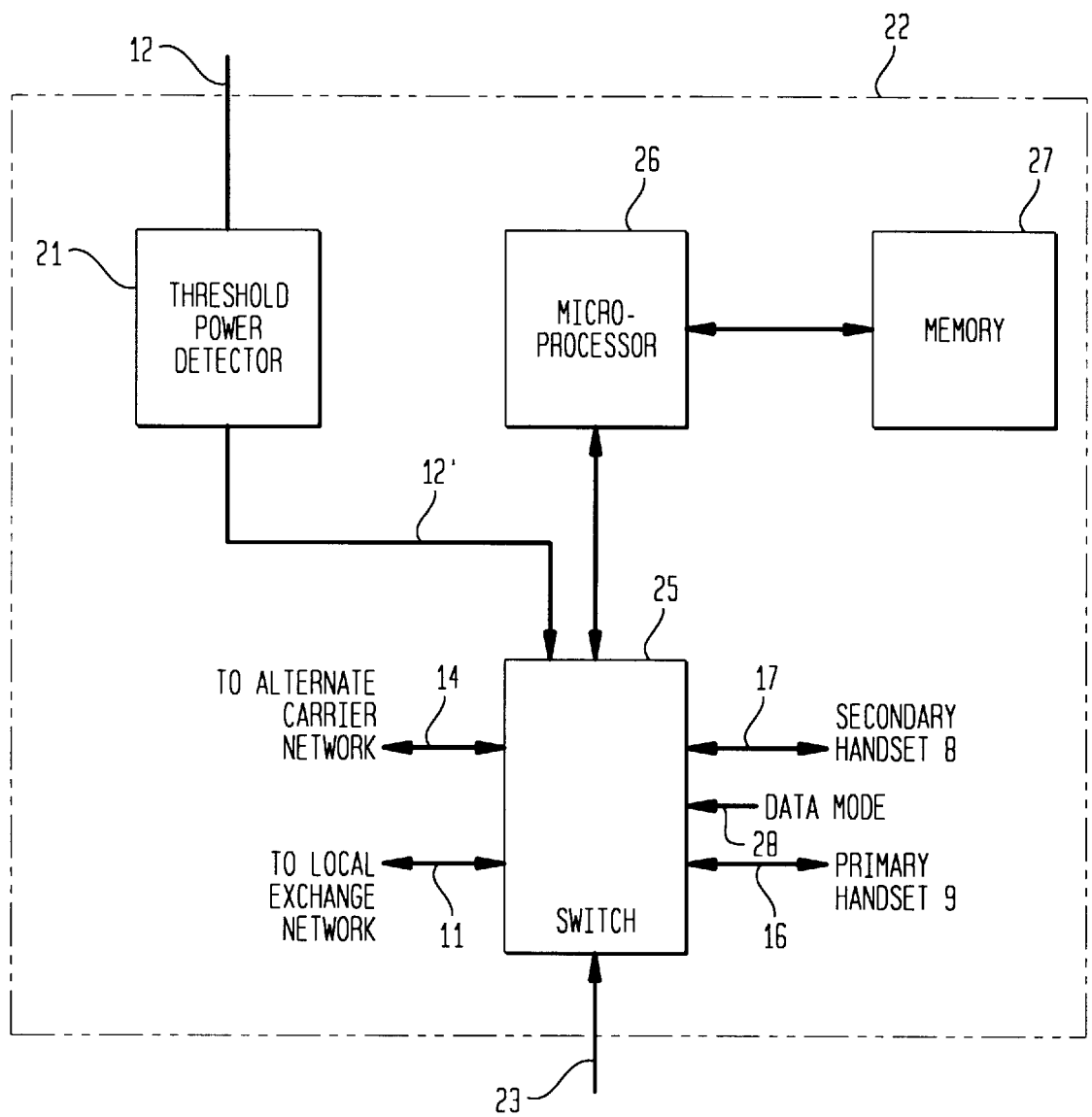

In FIGS. 1 through 2b, power source 5, functions as a control signal for switch 25 to direct telephone traffic through either network 3 or 4. When power is detected by media selection device 1, through threshold power detector 21, input to the switch 25 is held high and traffic is routed to the alternate carrier network 3. However, in the absence of subscriber power, traffic flow is directed to the local exchange network 4.

More specifically and as shown in FIG. 2b, one embodiment of the media selection device 1 includes a switch 25, a threshold power detector 21, a microprocessor 26 and memory 27. In a first state of operation, switch 25 connects subscriber handset 9 to receiver/transmitter 2 and alternate carrier network 3 when subscriber power is detected. In a second state of operation, switch 25 connects subscriber handset 9 to RJ-11 jack 7 and local exchange carrier 4 when threshold power is not detected. In this mode of operation, incoming or outgoing calls are switched from one network 3 to the other network 4 depending upon the state of the controller 22.

The operational state of controller 22 is controlled by the state of subscriber power as represented by connection 12. When subscriber power is sensed, control input 12 goes high, and switch 25 couples connection 14 to connection 16. When threshold power is not detected, control input 12 goes low, and switch 25 couples connection 11 to connection 16. In the above embodiment, any one of many available threshold power detectors, as are known in the art, may be used to trigger an output high to connection 12 in controller 22.

Although other components have been referenced, it should be understood that controller 22 may simply be or include a spring-loaded switch, which when powered holds the contacts in one position and when power is removed releases causing the contacts to close in a second position.

Optionally, controller 22 may include a second connection 17 to which a second subscriber handset 8 can be connected, and which permits two separate telephone channels to be passed through the switch 25 at all times. The primary channel 16 operates as previously described, while the secondary channel 17 would be exclusively used with the local exchange network 4. In this case, both networks could be used simultaneously. In the event of an incoming call, controller 22 rings second handset 8 while using a distinctive ring to indicate that the second channel is being utilized.

In this mode of operation, controller 22 may include one or more cross-connect switches that either connect the lines straight through, or in a crossing pattern, i.e., connection 14 to connection 16 and connection 11 to connection 17 or connection 14 to connection 17 and connection 11 to connection 16, respectively (not shown). As before, the state of the switch 22 is controlled by the state of the power source as represented by connection 12, although such a state can be overridden by a manual override switch 23.

As can be seen in FIGS. 1, 2a and 2b, the two telephone networks 3, 4 are functionally connected in parallel in media selection device 1. Consequently, two telephone channels exist—one from local exchange network 4 through the media selection device 1, to the telephone handset 9, and a second channel from the alternate carrier network 3 to the media selection device 1, and to the handset 9.

While power is supplied to the media selection device 1, originating calls are transmitted from the telephone handset 9 to the media selection device 1 via connection 16 to receiver/transmitter 2 via connection 14, and to the alternate telecommunications network 3 via connection 15. Conversely, incoming calls are transmitted from the alternate carrier network 3 to the receiver transmitter 2 via connection 15 to the media selection device 1 via connection 14, to the telephone handset 9 via connection 16.

The present invention is also intended to allow use of the local exchange network 4 for emergency calls, such as 911 calls, or some other set of specified telephone numbers, such as 411, 611 or international calls. In order to realize such a feature, controller 22 may be programmable so as to utilize one telecommunications network for certain types of originating calls. These special calls can be specified by inputting or downloading sets of instruction into memory 27 for later execution by microprocessor 26 in media selection device 1.

For example, should the media device 1 require programming, a call is made to a servicing telephone number which will permit the downloading of specific software. After the call is made and the remote site answers the call, the data mode switch 28 is engaged to enable the microprocessor 26 to communicate with a remote location and to download software and other instructions. Data acquired from the remote location is stored by the microprocessor 26 in memory 27. In this manner, the media selection device 1 is programmable and highly flexible in the selection and operation of the available networks.

Using this download feature, the present invention may incorporate the predetermined switching of certain types of long distance calls to the local exchange network 3 or to the alternate carrier network 4, depending upon which offers the most competitive rates for that type of long distance call. Since each network 3, 4 can utilize different long distance carriers, the subscriber can select a different long distance carrier for each line. In this manner, a subscriber can select, for example, one long distance carrier for international calls, and another for domestic out of state long distance calls. Such an option is valuable when one realizes that some domestic calls can be more expensive than some international calls. Simply put, this media selection device enables the consumer to configure his or her telephone service specifically to his or her needs.

The media selection device 1 may also include a manual override switch 23 which enables a user to select which telecommunications network 3, 4 will be used in a particular telephone call. This feature enables the subscriber under certain circumstances to override the normal setting and to disable the switching from one network to the other. For example, if the subscriber wishes to discontinue service with his existing alternate service carrier and begin service with a different alternate carrier, during a period of time when the user has no alternate carrier service, then by using the manual override switch 23, the user can set the media selection device 1 to select the local loop network 4. In this case, originating calls are transmitted from the telephone handset 9 to the media selection device 1 via connection 16 to the RJ-11 jack 7 via connection 11 to the existing local exchange network 4, via connection 10. Incoming calls are transmitted from the local exchange network 4 to the RJ-11 jack 7 via connection 10 to the media selection device 1 via connection 11 and to the telephone handset 9 via connection 16. In a variation to the above embodiment, manual override switch 23 may be used to disable control input 12 from the power source so that it appears as if power is always off or power is always on.

As such, incoming calls can be received over an existing local exchange network 4 without interfering with, and concurrently with a call over the alternate carrier network 3. During a call on the alternate carrier network 3, the media selection device 1 disconnects handset 9 from the local exchange network 4 in order that ringing voltages are not transferred to the telephone handset, but rather a call waiting pulse is sent, and thus, incoming calls will not interfere with existing calls.

The present invention thus allows subscribers to keep minimum local service, maintain their current telephone number and current handsets while at the same time using the alternate networks 3 for originating calls. Moreover, alternate carrier network 3 also functions, in effect, as a backup for the existing local exchange network 4 when the local exchange network 4 is unavailable. As a result, the availability of telephone service is improved immensely for the consumer.

Figure 2C:
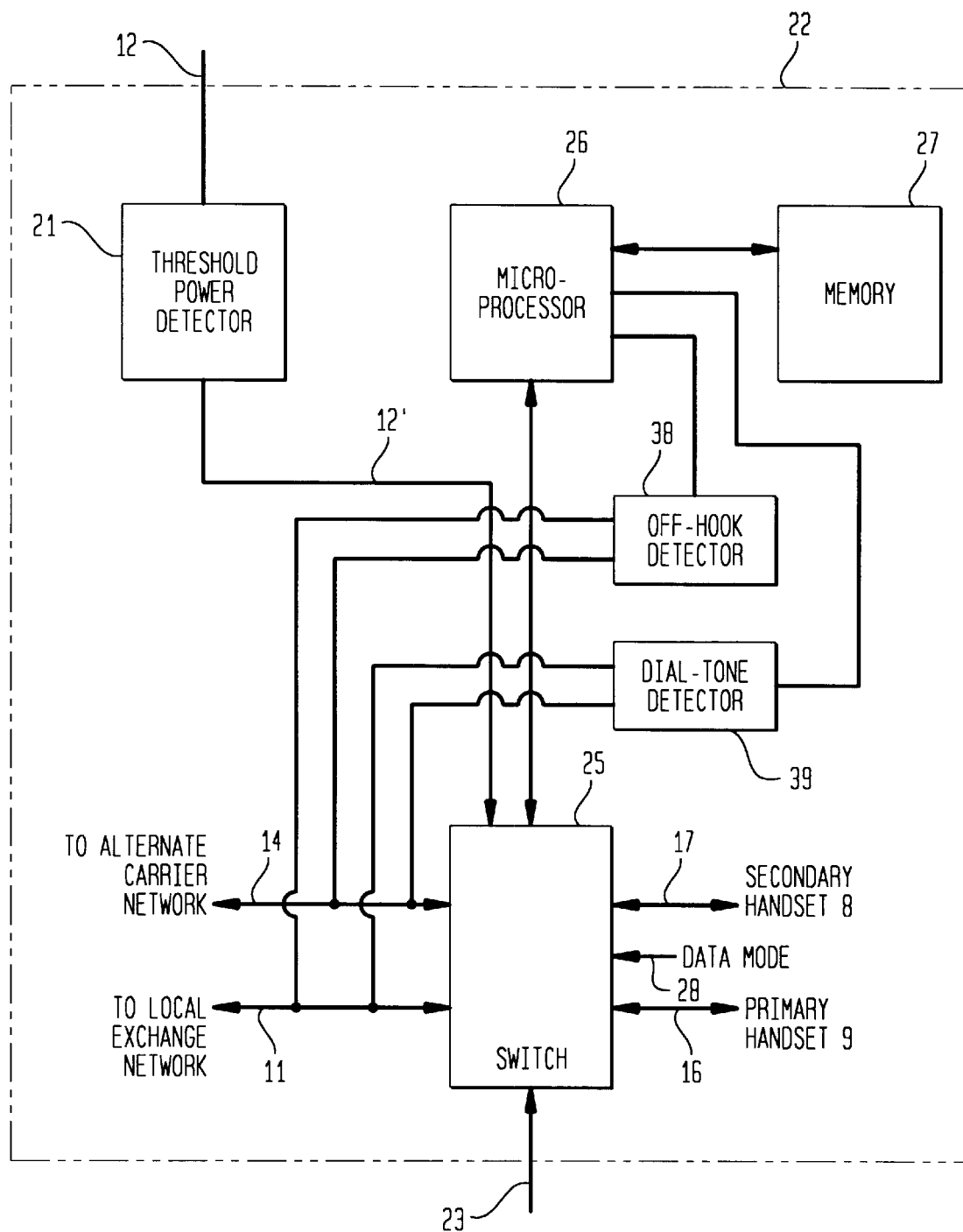
FIG. 2c shows the components of the controller in FIG. 2b with an off-hook and a dial-tone detector.

In yet another embodiment of the present invention, the media selection device as shown in FIG. 2c, includes a dial-tone detector 39 and an off-hook detector 38, which are used to measure the delay time between the time a handset goes into an off-hook state and the time dial-tone was received. When the handset goes off-hook, the microprocessor 26 is notified of an off-hook state by the off-hook detector 38. The microprocessor then starts a timer (not shown). Thereafter, when the dial-tone detector 39 senses dial-tone, it forwards a signal to microprocessor 26 to stop the timer. The delay time is then calculated by the microprocessor by taking the difference between the off-hook state and the time at which dial tone is received. Once the delay time has been calculated, the media selection device 1 will, according to a programmed set of instructions stored in memory and executable by a microprocessor, either remain as configured or switch to the other communications network. If the delay time is beyond an anticipated threshold, a switch over occurs—the assumption being that a delay beyond an acceptable range is indicative of transmission problems. The switch over can occur from the alternate carrier network 3 to the local exchange network 4 or vice versa. Accordingly, such an embodiment further enhances reliability of service by anticipating potential network transmission problems and selecting the more reliable network.

Figure 3:
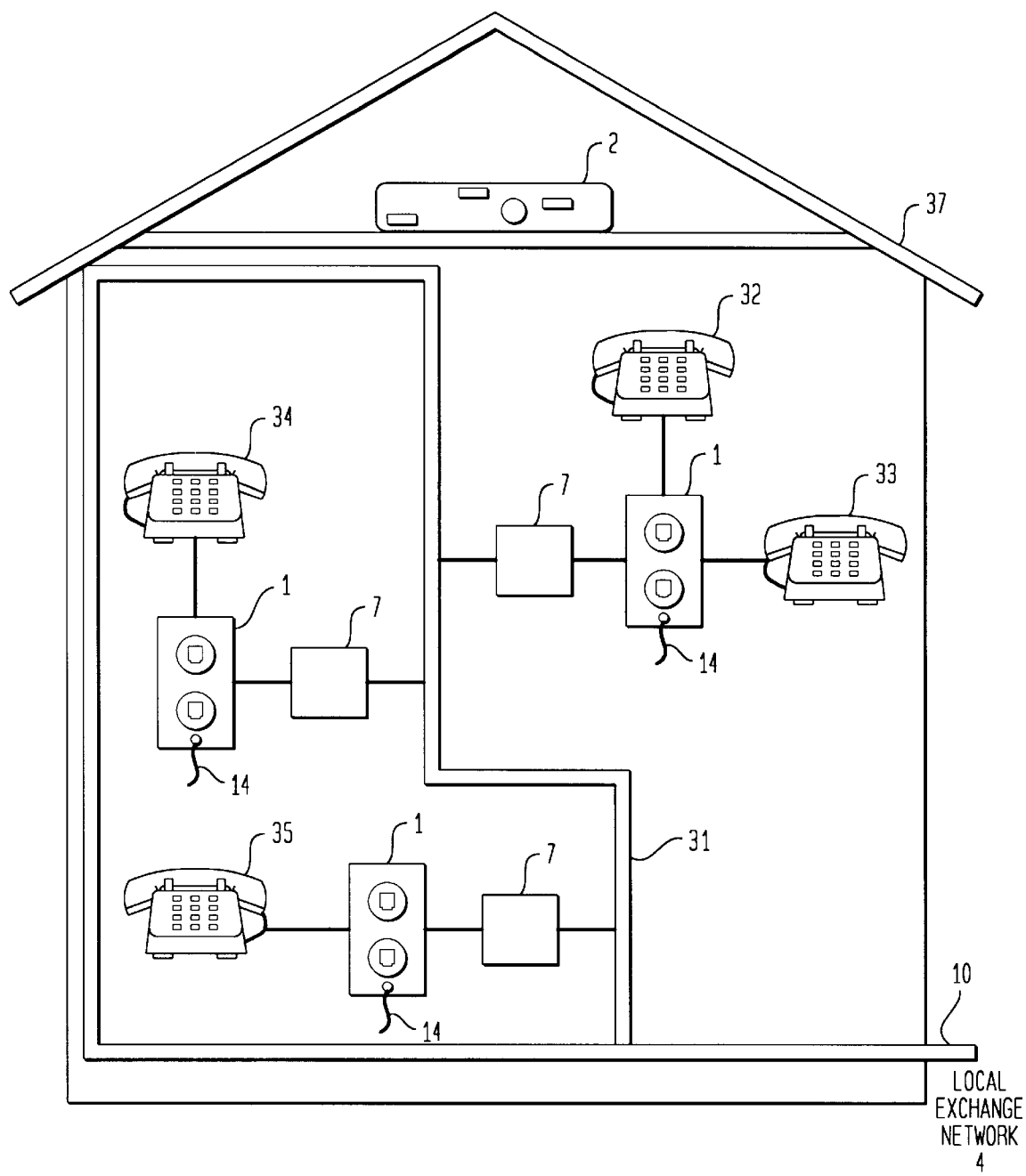
FIG. 3 shows a diagram of multiple media selection devices when connected to the local interior wiring in a house.

FIG. 3 shows the inside wiring local loop 31 within the house 37. Loop 31 is connected to the local exchange telephone network 4 via connection 10. Usually, the first RJ-11 jack is connected to the local telephone network 4 via connection 10, while the remaining jacks 7 are connected in a loop with the first jack. Each of the RJ-11 jacks 7 are on this loop 31. Every telephone 32, 33, 34, 35 has a media selection device 1 coupled between it and the RJ-11 jack 7. Telephones 32 and 33 are coupled to a single media selection device 1.

When a user makes an outgoing call on the alternate carrier network 3 using one of the telephones, such as telephone 34 (via a 900 MHz for example), the media selection device 1 disconnects telephone 34 from the loop 31. When an incoming call then comes in from the existing local exchange network 4 during the outgoing call on the alternate carrier network 3, a voltage spike appears on loop 31, in order to ring the other telephones 32, 33, 35. The ringing voltage is then forwarded to all telephone handsets 32, 33, and 35, except for telephone handset 34, currently in use on the alternate carrier network 3. The media selection device passes an interrupt signal in the form of a click or a tone to handset 34 so as to indicate the presence of another call, e.g., a call waiting tone. However, it should be understood that a telephone not connected to a media selection device 1, will also ring when connected to loop 31 directly.

Similarly, when the subscriber makes an outgoing call on the alternate carrier network 3 using one of the telephone handsets, the media selection device 1 disconnects that telephone handset from the loop 31 so that when another user picks up a different handset to dial and presses the override switch 23, this second outgoing call is passed to the local exchange network 4 without disrupting the call on the alternate carrier network 3. If desired, a subscriber may participate in an existing call on the alternate carrier network 3, by simply picking up another handset.

In addition, media selection device 1 may also include a voltage detector to detect a voltage spike and to create a call-waiting tone on a phone already in use. Since such a voltage detector is a well known device in the art, it will not be discussed at length herein.

The foregoing description of embodiments of the present invention should be considered as illustrative, and not as limiting. The different types of communication links between handset and transmitter/receiver and the use of a spring-loaded switch, for example, are indicative of variations to the apparatus and method of the invention which may be used without departing from the scope of the invention. Various other changes and modifications will occur to those skilled in the art for accomplishing the same result, and for operating in substantially the same way, without departing from the true scope of the invention as defined in the claims appended hereto.

What is claimed is:

1. A method of switching between an alternate communications network and a local exchange network, comprising the steps of:

configuring said alternate communications network and said local exchange network in selectable engagement with a communications device;

switching between said alternate communications network and said local exchange network as a function of a state of available local power detected by a switch that performs said switching; and reprogramming remotely a controller coupled to said switch said controller for calculating a delay time based on a time when an off-hook state occurs and a time when a dial-tone is received, and for controlling said switching as a function of said calculated delay time.

2. The method according to claim 1, further comprising the steps of:

detecting the state of available local power; and switching from said alternate communications network to said local exchange network upon detecting that said available local power is insufficient.

3. The method according to claim 1, wherein the state of available local power comprises a loss of threshold operating power.

4. The method according to claim 1, wherein the state of available local power comprises a loss of local power.

5. The method according to claim 1, wherein the state of available local power comprises a reduction in threshold voltage to operate said switch.

6. The method according to claim 1, wherein the state of available local power comprises a reduction in threshold current to operate said switch.

7. The method according to claim 1, wherein said step of configuring said alternate communications network and said local exchange network comprises coupling said alternate communication network in parallel with said local exchange network.

8. The method according to claim 1, further comprising the steps of:
transmitting outgoing calls to the alternate communications network when said local power is active; and
switching all incoming calls from said alternate communications network and said local exchange network to said communications device.

9. The method according to claim 1, further comprising the steps of:
detecting said communications device in an off-hook state; and
detecting the reception of a dial-tone after said communications device is in an off-hook state.

10. The method according to claim 9, further comprising the steps of:
calculating a delay time between the time at which said communications device goes off-hook and the communications device receives a dial-tone; and
determining whether to switch between said networks in the event that the calculated delay time exceeds an acceptable range.

11. The method according to claim 8, wherein said step of transmitting outgoing calls compress switching all emergency related calls to said local exchange network.

12. A method for providing telecommunications services during a power outage to a communications device operates over an alternate communications network, comprising the steps of:
detecting a state of available local power by a switch that switches, in the event of an outage of said local power, the network over which said communications device operates from said alternate communications network to a local exchange;
switching telecommunications services in the event of a power outage from said alternate communications network to a remotely powered local exchange network; and
reprogramming remotely a controller coupled to said switch, said controller for calculating a delay time based on a time when an off-hook state occurs and a time when a dial-tone is received and for controlling said switch as a function of said calculated delay time.

13. An apparatus for coupling a communication device to two communications service providers, said apparatus comprising:
means for coupling said two communications service providers in a functionally parallel mode of operation with said communications device;
means for switching communications service from one of said two of said two communications service providers to the other communications service provider upon detection of a loss of power;
means for accepting remote reprogramming instructions to enable remote reprogramming of a means for controlling coupled to the means for switching, the means for controlling for calculating a delay time based on a time when an off-hook state occurs and a time when a dial-tone is received, and for controlling said means for switching as a function of said calculated delay time.

14. The apparatus according to claim 13, wherein the means for coupling comprises a media selection device comprising a first input/output connection for coupling to a first of said two communications service providers, a second input/output connection for coupling to a second of two communications service providers, an input connection for coupling to a local power source, and an input/output connection for coupling to said communications device.

15. The apparatus according to claim 13, wherein said means for switching comprises a means for detecting local power.

16. The apparatus according to claim 13, wherein said means for switching comprises a spring-loaded switch which maintains a first state when power is connected to said switch and switches to a second state when power is disconnected from said switch.

17. The apparatus according to claim 14, wherein the media selection device comprises two or more input/output connections for coupling to two or more communications devices.

18. A device for coupling to a telephone that communicates via an alternate communications network, and operates from a local power source, and for enabling the telephone to operate on a local exchange carrier during power outages, said device comprising:
a first interface to said local exchange carrier for sending and receiving telephone signals;
a power detector coupled to said local power source for detecting a change in state of the power from the local power source;
a second interface to the alternate communications network for sending and receiving telephone signals;
a third interface to said telephone for sending and receiving telephone signals;
a means of switching telephone signals from said second interface to said first interface upon the detection of a change in state of the local power from the local power source;
a remotely reprogrammable controller coupled to said means for switching an accepting programming instructions via a telephone call, said controller for calculating a delay time based on a time when an off-hook state occurs and a time when a dial-tone is received, and for controlling said means for switching as a function of said calculated delay time.

19. The device according to claim 18, further comprising a second input/output for coupling to a second telephone, and wherein said device can establish two telephone channels simultaneously.

20. The device according to claim 19, wherein said two simultaneous channels are established on both the alternate communications carrier and the local exchange carrier.

21. The device according to claim 18, further comprising an off-hook detector for detecting whether said telephone coupled to said device is off-hook and for disconnecting said telephone from said local exchange carrier if said telephone is off-hook and is being used on said alternate communications network.

22. The device according to claim 18, further comprising a voltage detector for detecting a ringing voltage, and for transmitting the ringing voltage to said telephone in the event said telephone is not off-hook and for transmitting a call waiting signal to said telephone in the event that said telephone is off-hook.

23. A media selection device for coupling between a communications device and at least two communications networks, comprising:

a switch activated by a loss of power to the media selection device, whereupon such activation, said switch decouples said communications device from one communications network and couples said communications switch to the other communications network; and a remotely reprogrammable controller coupled to said switch and accepting new programming instructions remotely, said controller for calculating a delay time based on a time when an off-hook state occurs and a time when a dial-tone is received, and for controlling said switch as a function of said calculated delay time.

24. The device according to claim 23, further comprising a receiver/transmitter for coupling to one of said communications networks.

25. The device according to claim 24, wherein the receiver/transmitter comprises a wireless receiver/transmitter.

26. The device according to claim 23, wherein the receiver/transmitter comprises a cable modem.

27. The device according to claim 23, further comprising a manual override switch that enables a user to select the communications network.

28. The device according to claim 23, further comprising a call director that automatically directs emergency calls to a predetermined communications network.

29. The device according to claim 23, further comprising a call director that automatically directs specified telephone numbers to a predetermined communications networks.

* * * * *